(12) United States Patent
Magnani

(10) Patent No.: US 6,237,666 B1
(45) Date of Patent: May 29, 2001

(54) KIT REMOVABLE ADAPTERS FOR MOUNTING AND REMOVING SPECIAL RUN-FLAT TIRES BY USING A CONVENTIONAL TIRE CHANGING MACHINE

(75) Inventor: Franco Magnani, Correggio (IT)

(73) Assignee: Sicam, S.r.l., Correggio (IT)

( * ) Notice: Subject to any disclaimer, the term of this patent is extended or adjusted under 35 U.S.C. 154(b) by 0 days.

(21) Appl. No.: 09/502,660

(22) Filed: Feb. 11, 2000

(30) Foreign Application Priority Data

Feb. 18, 1999 (IT) .............................................. MO99A0027

(51) Int. Cl.⁷ .................................................. B60C 25/04
(52) U.S. Cl. .............................................. 157/1.3; 157/1.2
(58) Field of Search ..................... 157/1.1, 1.11, 157/1.17, 1.22, 1.24, 1.3

(56) References Cited

U.S. PATENT DOCUMENTS

| | | | |
|---|---|---|---|
| 3,746,069 | * 7/1973 | Blomgren, Sr. et al. | ........... 157/1.26 |
| 4,580,612 | * 4/1986 | Smithkey | ................................ 157/1.2 |
| 5,191,934 | * 3/1993 | Wicklund | ............................... 157/1.3 |
| 5,806,578 | * 9/1998 | Gonzaga | ................................ 157/1.3 |
| 6,056,034 | * 5/2000 | Matnick | ............................... 157/1.17 |

* cited by examiner

*Primary Examiner*—Eileen P. Morgan
*Assistant Examiner*—Joni B. Danganan

(57) ABSTRACT

A kit of removable adapters for converting conventional kinds of tire changing machine into tire changing machines for special run-flat tires comprising: a first separator element for separating the tire and the wheel rim shaped and fixable by way of complementarily shaped profiles and with corresponding devices to the lower end of the conventional corresponding vertical tool with which the tire changing machine is provided; a second bead breaker element provided with an auxiliary shoe for contacting and pushing the beads of a tire and with coupling elements for removable coupling to the conventional bead breaker shoe with which the tire changing machine is equipped; a lever for the localized extraction of the beads of the tires from the respective flanges of the wheel rims, which can be functionally coupled to supporting elements adapted for resting against the wheel rim in order to protect the wheel rim.

7 Claims, 5 Drawing Sheets

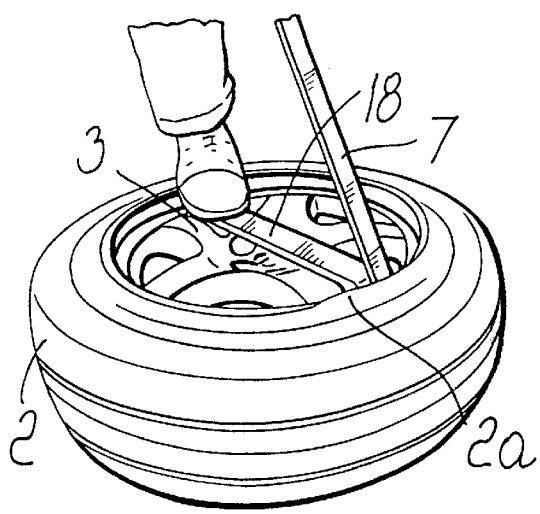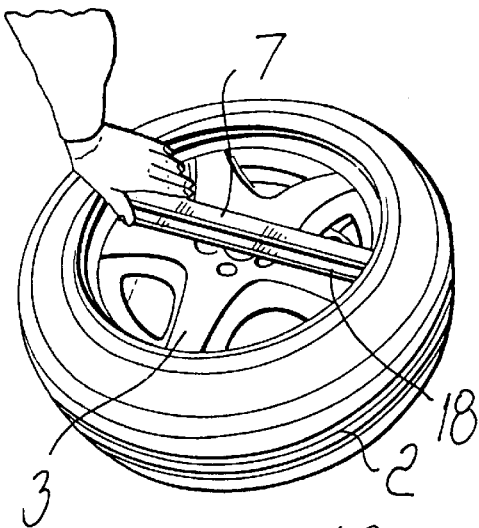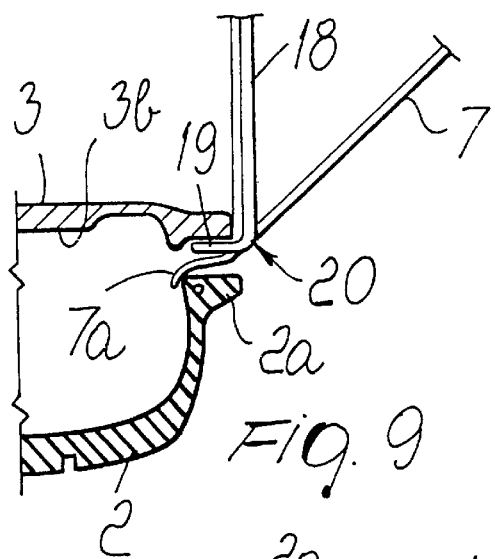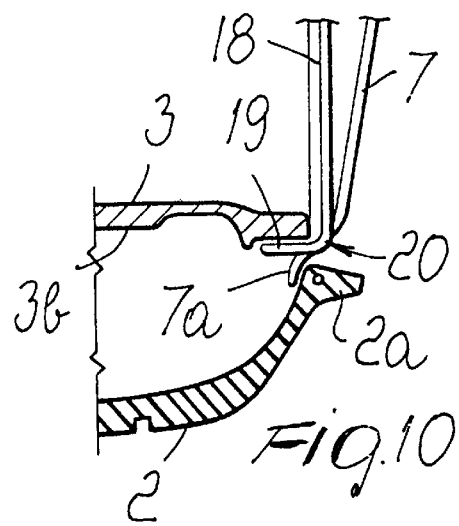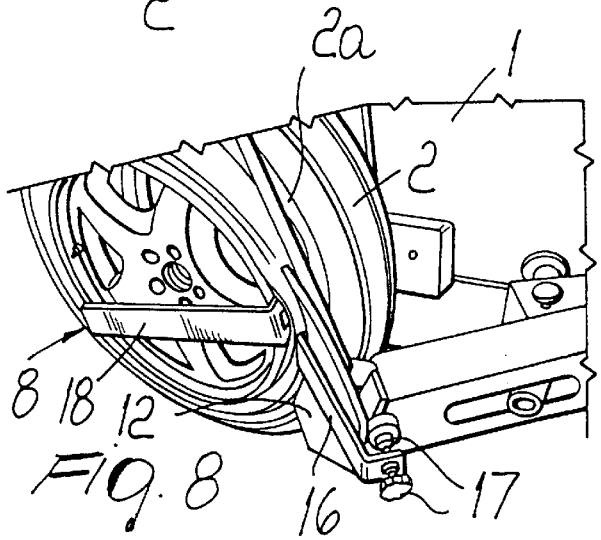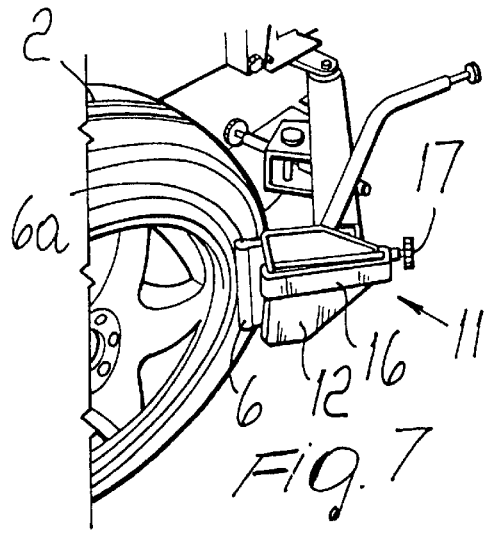

KIT REMOVABLE ADAPTERS FOR MOUNTING AND REMOVING SPECIAL RUN-FLAT TIRES BY USING A CONVENTIONAL TIRE CHANGING MACHINE

BACKGROUND OF THE INVENTION

The present invention relates to a kit of removable adapters for converting conventional tire changing machines into tire changing machines for special run-flat tires.

Special tires have long been studied and are currently being manufactured and marketed. Their structure allows, in case of puncture or damage, to avoid their complete deflation despite the lack of internal pressure, accordingly allowing the vehicle to continue to travel without having to replace the damaged tire and thus eliminating the severe consequences of such situations suffered with conventional tires.

The particular structure of these tires, of the tubeless type, entails fitting and rigidly coupling, between the bead seat of the wheel rim and the very tire, a ring of adequate thickness made of an elastomer which, in case of sudden deflation of the tire and consequent reduction of the inflation pressure to zero, continues to bear the weight of the vehicle and allows to continue the regular rolling of the wheel, avoiding any sudden swerving of the vehicle and damages to the tire.

One particularity of these tires is the fact that the inside and outside diameters are different from each other, the former being larger than the latter.

Moreover, the so-called bead has a profile with a particular cross-section and is internally reinforced with an annular steel cable in order to maintain the grip against the edges of the wheel rim.

This in practice makes impossible to use, in order to remove and fit the tires to the wheel rim, the conventional machines that are currently manufactured. Accordingly, due to their limited diffusion owing to the fact that such tires have been marketed only recently, these operations are performed only by hand, by using levers which, during removal, are forcibly inserted between the edge of the wheel rim and the bead of the tire in order to extract it from its seat or to insert it therein during mounting. Heavy hammers are used with which the beads of the tires are struck with rough accuracy in order to force them to pass over the flanges of the tire rims so as to achieve their correct placement and thus complete their mounting.

This operating method is very difficult for operators and is slow and dangerous for the integrity of the wheel rims, since the levers that are employed rest on the edges of the wheel rims in order to be able to apply force in the maneuver for lifting the beads, and the blows inflicted with the hammers sometimes strike the wheel rim instead of the tire.

SUMMARY OF THE INVENTION

The aim of the present invention is to solve the above-described problems of the prior art by providing a kit of removable adapters for converting conventional tire changing machines into tire changing machines for special run-flat tires which allows to work quickly and automatically, without effort for the operators and with no danger of damaging the wheel rims, all this without needing to have a specifically conceived and manufactured tire changing machine.

This aim, this object and others are achieved by a kit of removable adapters for converting conventional tire changing machines into tire changing machines for special run-flat tires, characterized in that it comprises: a first element for guiding the beads of the tire, which can be interposed between the beads and the wheel rim and is shaped and fixable according to complementarily shaped profiles and with corresponding means to the lower end of the conventional corresponding vertical tool with which the tire changing machine is provided; a second bead breaker element provided with an auxiliary shoe for contacting and pushing the beads of a tire and with means for removable coupling to the conventional bead breaker shoe with which the tire changing machine is equipped; a lever for the localized extraction of the beads of the tires from the respective flanges of the wheel rims, which can be functionally coupled to means for resting against the wheel rim in order to protect the wheel rim; a base for supporting the wheel rims, which can be rigidly coupled to the rotating platform of the tire changing machine in order to constantly maintain the distance between the platform and the edges of the wheel rim.

BRIEF DESCRIPTION OF THE DRAWINGS

Further characteristics and advantages will become apparent from the following description of a preferred embodiment of a kit of removable adapters for converting conventional tire changing machines into tire changing machines for special run-flat tires, illustrated only by way of non-limitative example in the accompanying drawings, wherein:

FIG. 7 is a view of an adapter applied to the bead breaker shoe of a tire changing machine;

FIG. 8 is a view of the same adapter as in FIG. 7 during use;

FIGS. 9 and 10 are schematic sectional views of wheel during the steps of the maneuver for extracting a bead of a tire from its wheel rim by using an adapter of the kit;

FIGS. 11 and 12 are perspective views of the same maneuver shown in FIGS. 9 and 10;

DESCRIPTION OF THE PREFERRED EMBODIMENTS

Figure 1:
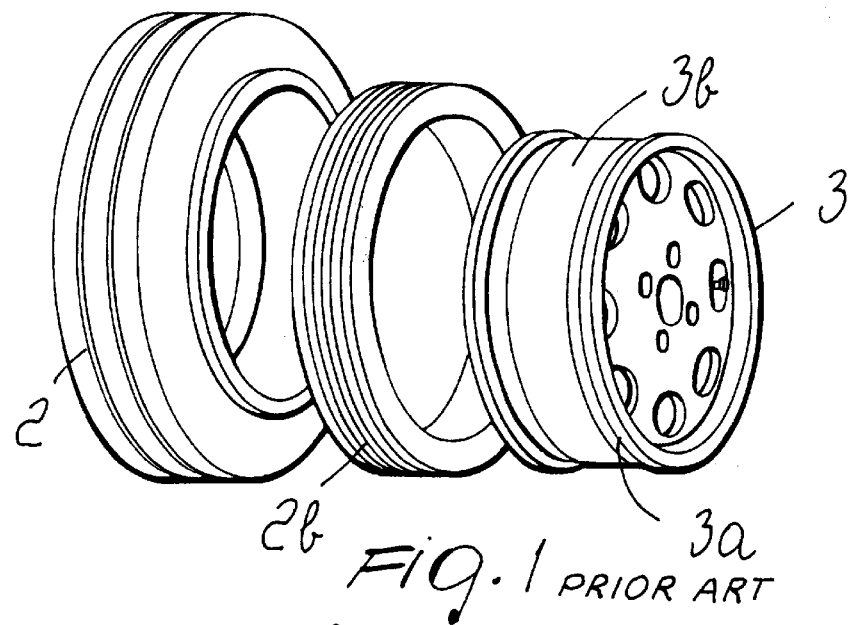
FIG. 1 is a perspective view of a tire of the special run-flat type in the configuration in which it is removed from the wheel rim.
Figure 2:
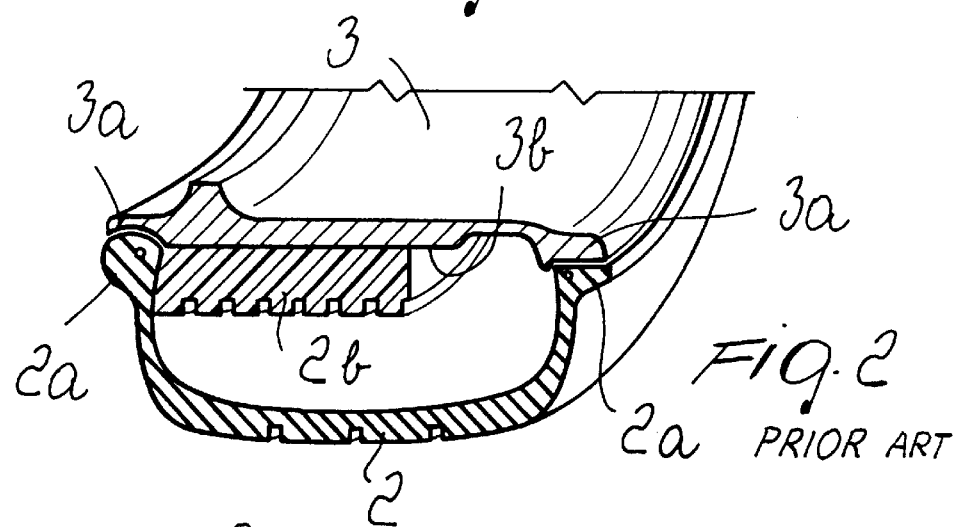
FIG. 2 is a partial transverse sectional view of a wheel provided with the special tire.
Figure 3:
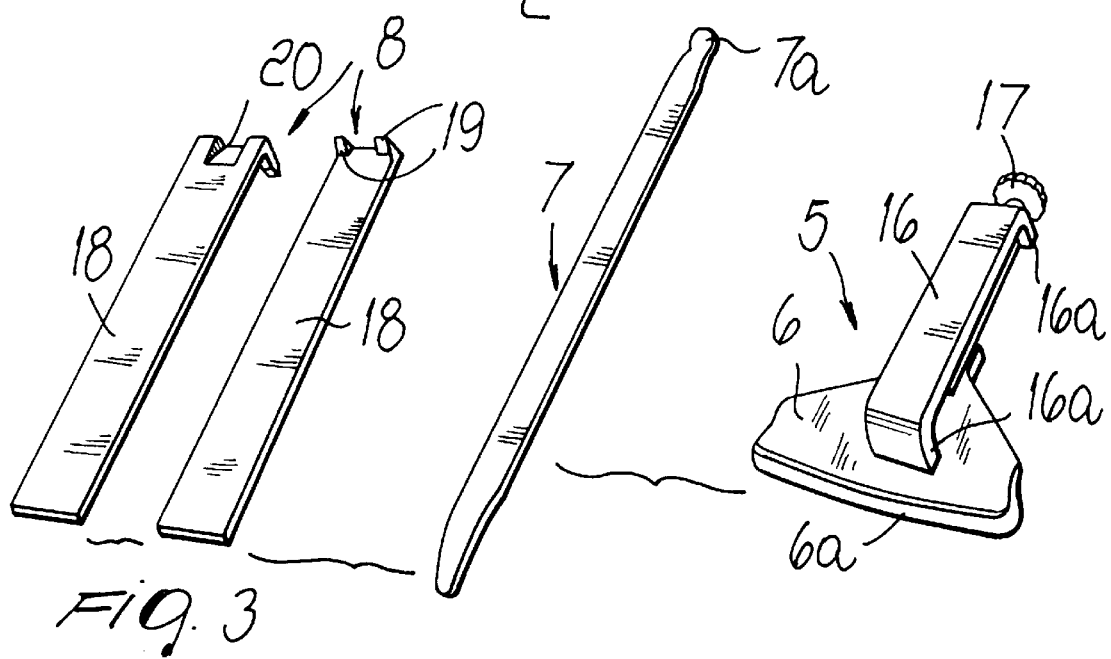
FIG. 3 is a view of a kit with some of the removable adapters according to the invention.
Figure 4:
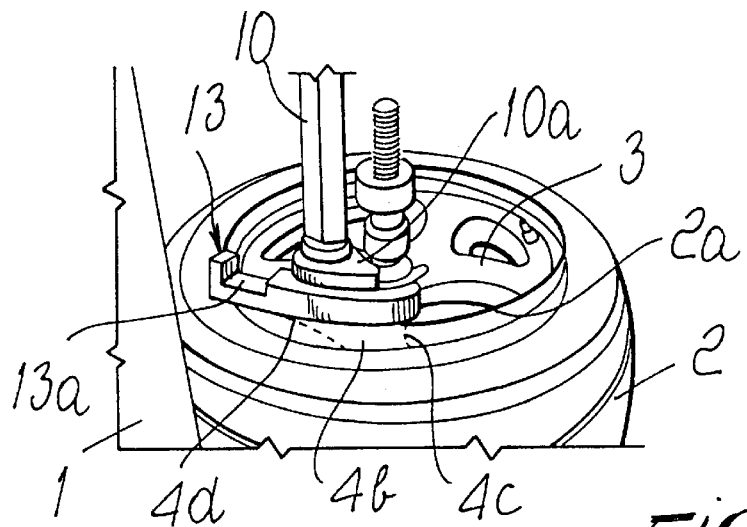
FIG. 4 is a view of another adapter in the working configuration, fitted on the tire removing tool supported at the end of the working arm of a conventional machine.
Figure 5:
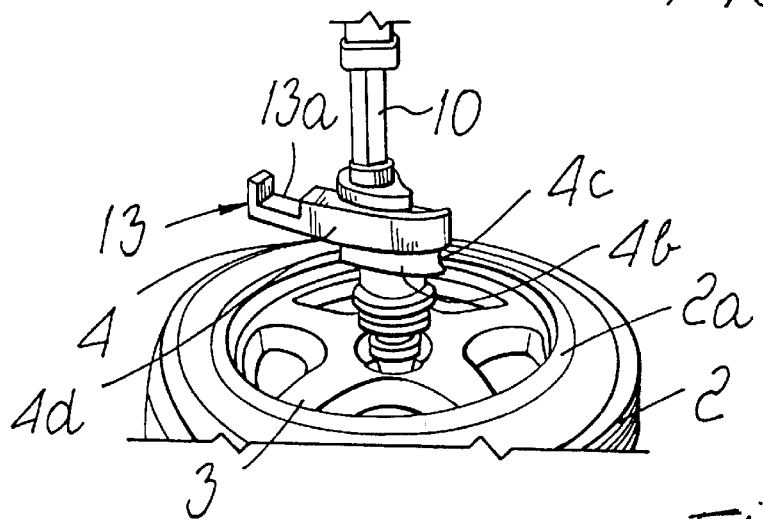
FIG. 5 is a view of the same adapter as in FIG. 4, in the raised inactive configuration.
Figure 6:
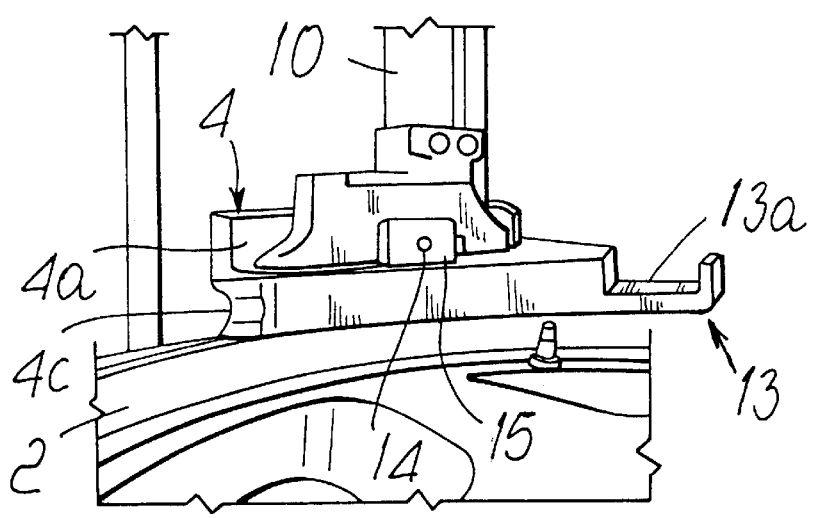
FIG. 6 is another view of the adapter of FIG. 4, taken from the inside looking outwards and in the active configuration.
Figure 13:
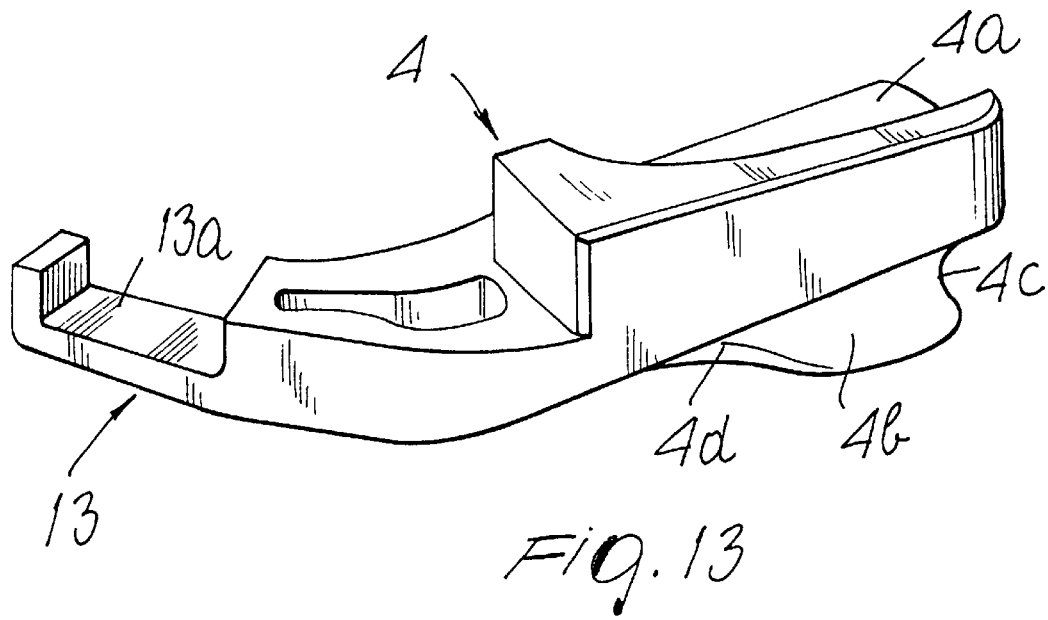
FIG. 13 is a detail view of the adapter shown in FIGS. 4, 5 and 6.

With reference to the above figures, 1 designates a portion of a tire changing machine of the conventional type.

The machine 1 can be converted, when necessary, to a machine which can be employed also to remove special tires 2 of the run-flat type from their wheel rim 3, applying the series of adapters that compose the kit according to the invention to the conventional tools with which the machine is equipped for working on normal tires.

This kit essentially comprises: a first element 4 for guiding the beads of a tire 2, which can be wedged between the beads and the edges 3a of a wheel rim 3; a second bead breaker element 5, provided with an auxiliary shoe 6; an extractor lever 7 which can be coupled to means 8 for resting on the wheel rim 3 in order to protect the integrity thereof; a base 9 for resting the wheel rims 3.

The guiding element 4 is shaped so as to have, on an upper face, a concave profile, in particular a seat 4a, which can be mated precisely with a protruding part of the extractor tool 10a normally provided at the lower end of the working arm 10 with which the tire changing machine 1 is provided.

The second bead breaker element 5, provided with the auxiliary shoe 6 for contacting and pushing the beads 2a of a tire 2, is also provided with means 11 for coupling, so as to allow removal after use, to the conventional bead extractor shoe 12 with which the tire changing machine 1 is provided.

The first guiding element 4 is constituted by a prism-shaped body which forms the hollow seat 4a on an upper face and forms, on the outer face, a longitudinal recess 4b which is substantially horizontal and has an initial guiding portion 4c, to allow the sliding contact of a corresponding raised portion of a bead 2a of a tire 2 which is turned on the working platform of the machine 1, and a median end portion 4d for the exit of the inclined bead towards the wheel rim 3 or, more precisely, towards the edge 3a thereof.

In an upward region, the body 4 further forms a tab 13 in which there is a hollow seat 13a, whereas in the lower region thereof there is a positioning claw 13b which protrudes therefrom.

The prism-shaped body 4 can be fixed to the corresponding vertical tool 10a with which the tire changing machine 1 is equipped by means of at least one threaded grub screw 14 (or of an equivalent screw means), which can be screwed transversely in a corresponding block 15 for retaining the vertical tool 10a until it makes contact with the outer surface thereof.

The second bead breaker element 5 has, on the active edge of the auxiliary shoe 6 on the front side for contact with the beads 2a, an enlarged edge 6a which has a rounded profile which is adapted to protect the beads during contact; the means 11 for detachable coupling to the conventional bead breaker shoe 12 are further constituted by a bar 16, whose ends 16a are folded so as to longitudinally wrap around the bead breaker shoe 12 with which the tire changing machine 1 is equipped; a first one of these ends is rigidly coupled to the outer face of the auxiliary shoe 6 and the second one is provided with screw means 17 for clamping to the conventional shoe 12.

The means 8 for resting on the wheel rim 3 are constituted by straight bars 18 which have, at one end, two teeth 19 which protrude substantially at right angles and are adapted to be inserted between the bead 2a and the wheel rim 3 and between which there is a slot 20 for the passage and resting, during operation, of the extractor lever 7, which is advantageously provided, at the working end, with a hook 7a which is adapted to wedge under the bead 2a.

Finally, the base 9 for supporting the wheel rims 3 is provided, in a downward region, with coupling means constituted by a perimetric edge 9a for coupling to the conventional wheel clamping elements (claws 1b) with which the rotating platform 1c of a tire changing machine 1 is provided; moreover, the base has, in an upward region, a series of radial arms 9b which are longer than the maximum radius of the wheel rims 3; antislip and wheel rim protection coatings 9c are applied to the upper surface of the arms.

Use of the invention, which has also been implicitly hinted in the above description, is as follows: when an operator must perform removal and subsequent refitting of a tire of the special run-flat type with respect to the corresponding wheel rim, he applies to the tool 10a and to the shoe 12 the guiding element 4 and the auxiliary shoe 6 respectively; he further places is the base 9 on the platform 1c of the tire changing machine 1, clamping its perimetric edge with the claws 1b.

The element 4 is applied to the tool 10a, inserting it precisely in the provided contoured seat 4a and fastening it in position with the threaded grub screw 14.

The auxiliary shoe 6 also is rigidly coupled to the shoe 12 by fitting thereon the bar 16 and the folded ends thereof, which wrap around it, and by tightening the screw means 17.

Therefore, in order to remove the special tire, the operator places the tire, which is of course deflated, against the side of the tire changing machine 1 where the shoe 12 is active, so that the smaller diameter faces outwards.

The shoe 12, and therefore the auxiliary shoe 6, are actuated so as to press against the bead 2a of the tire 2 in a conventional manner; the enlarged edge 6a is first moved into contact with the bead and then the thrusting force is increased so that the bead 2a is pushed towards the internal channel 3b of the wheel rim 3.

The operator then inserts in the gap thus formed the teeth 19 of one of the straight bars 18, and after gripping the extractor lever 7 he wedges the hook-shaped end 7a thereof into the slot 20, pushing it until it reaches the lower inner edge of the bead 2a (see FIGS. 9 to 12).

By then operating the lever 7, the operator extracts a first portion of the bead 2a from the edge 3a of the wheel rim 3.

The operation is repeated in multiple points of the tire until the bead 2a having the smaller diameter is fully detached from the edge 3a.

The operator then turns the wheel over so that its larger diameter faces the machine 1 and places the wheel in contact with the side of the machine.

The operator then repeats the preceding operation of pressing with the auxiliary shoe 6 also for the bead 2a having the larger diameter and in multiple points thereof, pushing it towards the internal channel 3b of the wheel rim 3; this simultaneously causes the full extraction of the ring 2b is from its seat and from the wheel rim 3 through its smaller diameter; the bead 2a having the larger diameter also follows the ring, and the tire 2 is thus fully removed from the wheel rim 3 through the smaller-diameter part thereof.

For the refitting operation, the operator prepares the tire 2 by placing the ring 2b inside it; then he fits both onto the wheel rim 3, inserting them from the smaller-diameter side thereof.

In order to correctly position the ring 2b in the channel 3b, he rests the wheel again on the side of the machine 1 where the shoe 12 operates together with the auxiliary shoe 6, so that the smaller diameter is directed outwards; he then actuates the shoe 6 so as to push the ring 2b into the correct position and simultaneously create the necessary space between the ring and the edge 3a of the wheel rim 3 for the subsequent arrangement of the corresponding bead 2a.

Once the insertion of the ring 2b has been completed, the operator places the wheel rim 3 on the base 9, clamping thereon a conventional self-centering clamp 21 of the screw type so that the smaller diameter is directed upwards; he then places a portion of the smaller-diameter bead 2a that is directed upwards in the longitudinal recess 4b of the guiding element 4, which is moved so that its lower face is in contact with the outer part of the edge 3a.

The operator then turns the platform 1c and the bead 2a follows, sliding inside it, the profile of the recess 4b, from the initial guiding portion 4c to the exit portion 4d which conveys it to the inside of the edge 3a of the wheel 3.

When the entire smaller-diameter bead 2a is finally stably accommodated, the operator removes the wheel from the base 9 and turns it over so that its larger diameter faces upwards.

The operator then extracts the larger bead 2a from the channel 3b of the wheel rim 3 in which it had been fitted: he grips the extractor lever 7 and inserts its hook-shaped end 7a between the bead 2a and the edge 3a of the wheel rim; he then rests the lever 7 in the hollow seat 13a of the tab 13, and using it as a fulcrum he raises a small portion of the bead beyond the edge 3a.

By then turning the platform 1c, he repeats the operation for multiple points of the bead 2a until it fully passes over the edge 3a of the wheel rim 3 and is extracted upwards from it.

In order to insert it again in the correct configuration, the operator places, by acting on the arm 10, the guiding element 4 so that its lower face rests practically in contact with the outer face of the edge 3a of the wheel rim 3 and so that the positioning claw 13b accordingly straddles the edge; he then inserts the bead in the recess 4b and turns the platform 1c.

Figure 14:
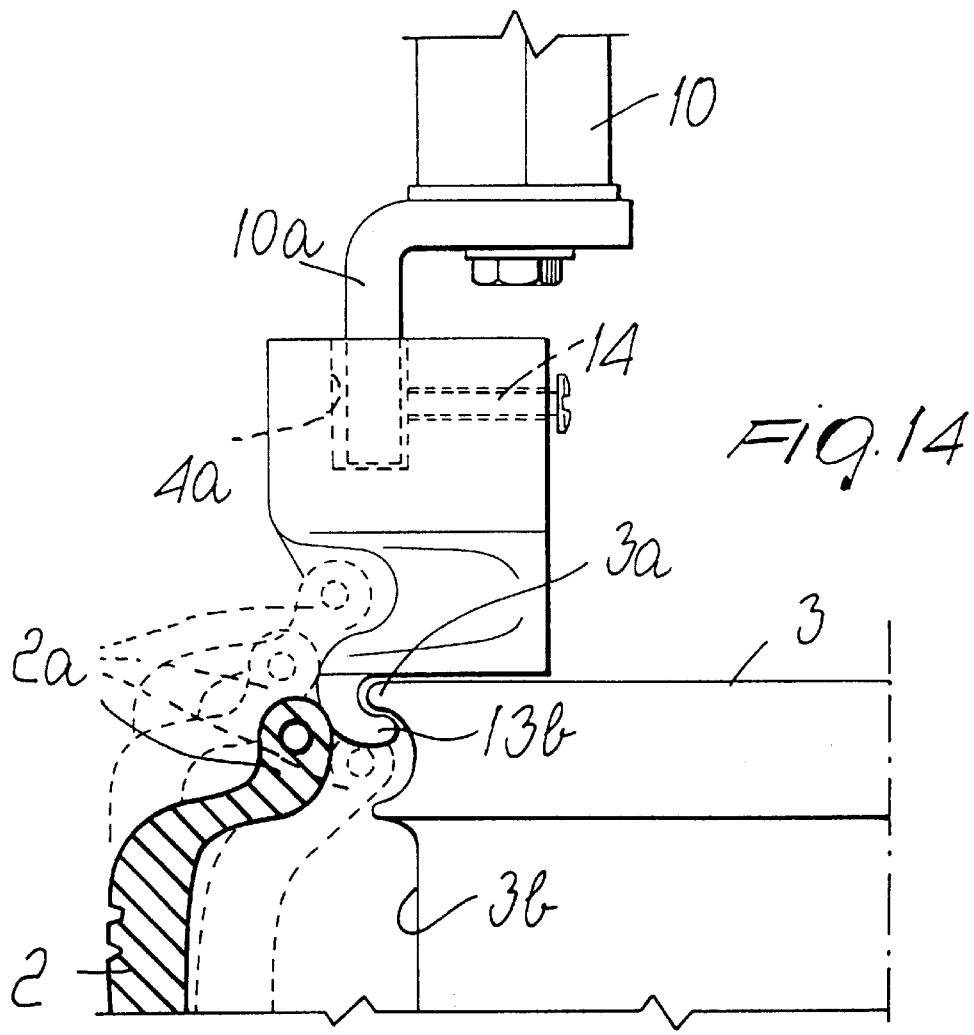
FIG. 14 is an enlarged-scale detail view of a wheel during the step for the fitting of a bead of a special tire on its wheel rim.
Figure 15:
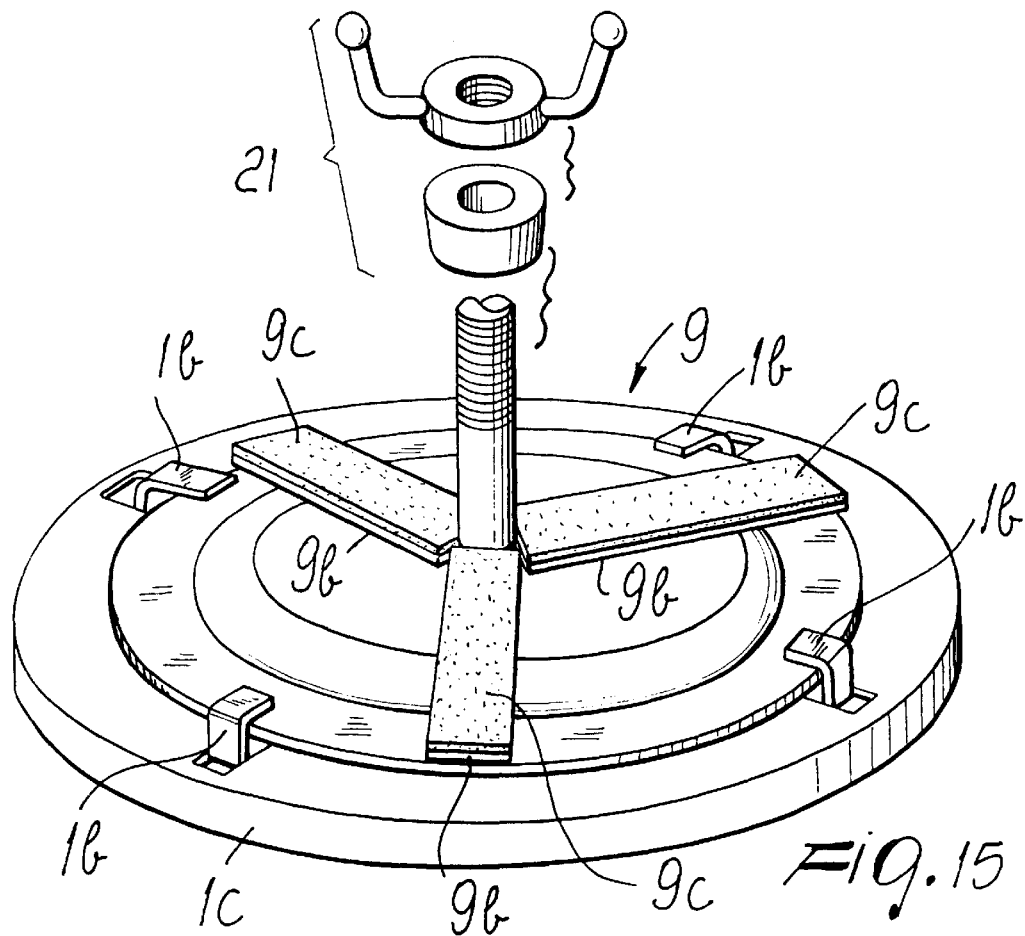
FIG. 15 is a view of a base for supporting a special wheel rim, applied to the platform of a conventional tire changing machine.
Figure 16:
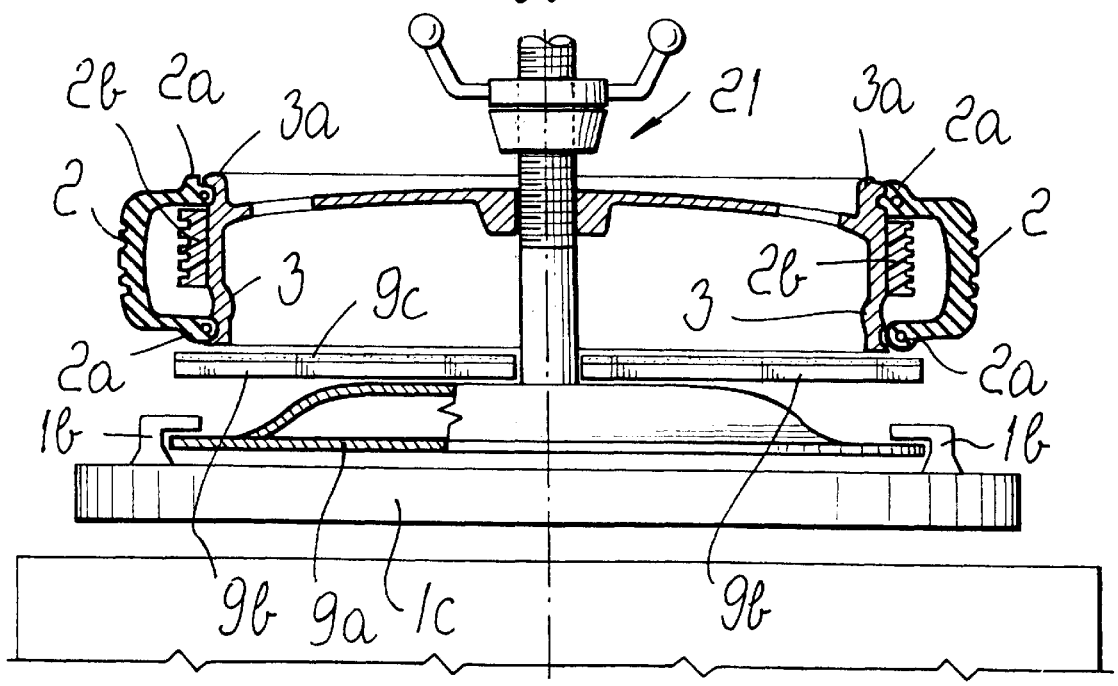
FIG. 16 is a schematic transverse sectional view of a wheel provided with a special tire and rested on the base shown in FIG. 15.

The combined action of the rotation, of the conveyance of the exit portion 4d of the recess 4b and of the positioning claw 13b gradually make the bead 2a slide, as shown in detail in FIG. 14, from the recess 4b into its seat for correct placement inside the channel 3a of the wheel rim 3, thus completing the mounting of the tire 2.

Once the intervention has been completed, by removing the guiding element 4, the auxiliary shoe 6 and the base 9 from the tire changing machine 1 the machine is converted back to a conventional machine.

In practice it has been observed that the above-described invention achieves the intended aim.

The invention thus conceived is susceptible of numerous modifications and variations, all of which are within the scope of the inventive concept.

All the details may further be replaced with other technically equivalent elements.

In practice, the materials employed, as well as the shapes and the dimensions, may be any according to requirements without thereby abandoning the scope of the protection of the appended claims.

What is claimed is:

1. A kit of removable adapters for mounting on and removing from a wheel a special run-flat tire by using a conventional tire changing machine provided with conventional vertical tool having a lower end provided with an extractor tool, bead breaker shoe, wheel fastening elements, and rotating platform, the kit comprising: a first separator element for separating the tire from the wheel rims, said separator element being shaped for mating engagement with said extractor tool of the tire changing machine and fixing means for fixing the separator element to said vertical tool; a second bead breaker element, provided with an auxiliary shoe for contacting and pushing a tire bead, and with coupling means for removable coupling to said conventional bead breaker shoe of the tire changing machine; a lever for localized extraction of the tire bead from respective flanges of the wheel rims; and rim resting means for resting against and protecting the wheel rims, said rim resting means being functionally coupleable, in use, to said lever.

2. The kit of claim 1, further comprising a wheel rim supporting base provided with coupling means for coupling to the conventional wheel fastening elements with which the rotating platform of a tire changing machine is provided.

3. The kit of claim 1, wherein said first separator element is constituted by a body being shaped so as to provide, on an inner-upper face thereof, a hollow seat, said hollow seat being adapted to accommodate a protruding part of said extractor tool and to precisely mate and interlock therewith, said body having further, on an opposite outer face, a horizontal longitudinal recess with an initial guiding portion for allowing sliding of a raised portion of the tire bead which is turned on the rotating platform, and a median end portion for causing exit of said bead towards an edge of the wheel rim.

4. The kit of claim 3, wherein said fixing means are constituted by at lease one grub screw and a block, said at least one grub screw being transversely screwable into said block for retaining said body on said vertical tool by contact at an outer surface of the vertical tool.

5. The kit of claim 1, wherein said second bead breaker element has, at an active edge of the auxiliary shoe for contact with the bead of the tire, an expanded edge which has a rounded profile.

6. The kit of claim 5, wherein said coupling means for removable coupling to said conventional bead breaker shoe are constituted by: a bar having first and second ends folded so as to longitudinally wrap around the conventional bead breaker shoe of the tire changing machine, with a first end being rigidly coupled to said auxiliary shoe; and screw means provided at the second end of the bar for clamping to said conventional bead breaker shoe.

7. The kit of claim 1, wherein said rim resting means are constituted by at least one straight bar provided, at one end, with two teeth separated by a slot, said teeth protruding substantially at right angles from said straight bar and being insertable between the bead and the wheel rim, and wherein said lever for localized extraction includes an extractor lever which is provided, at one active end, with a hook for wedging under said bead, said extractor lever being arranged, in use, resting in said slot.

* * * * *